(12) United States Patent
Myers et al.

(10) Patent No.: US 8,490,935 B2
(45) Date of Patent: Jul. 23, 2013

(54) MULTIPURPOSE HOOK

(75) Inventors: Ronald W. Myers, Dublin, OH (US); John Barlow, Jr., Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 402 days.

(21) Appl. No.: 12/607,091

(22) Filed: Oct. 28, 2009

(65) Prior Publication Data

US 2011/0095156 A1   Apr. 28, 2011

(51) Int. Cl.
*F16B 45/00*   (2006.01)

(52) U.S. Cl.
USPC ............ 248/308; 248/341; 248/289.11

(58) Field of Classification Search
USPC .......... 248/304, 309.2, 294.1, 290.1, 305, 248/313, 308, 341, 289.11, 306, 322, 291.1, 248/292.13, 339, 301; 296/1.07; 224/553, 224/313, 312, 327; 24/343, 363, 366, 369, 24/376, 377, 380; 108/44, 135, 160; 211/118, 211/113, 123, 105.1, 96
See application file for complete search history.

(56) References Cited

U.S. PATENT DOCUMENTS

| | | | |
|---|---|---|---|
| 633,742 A | 9/1899 | Turner | |
| 3,329,385 A | 7/1967 | Dietsch | |
| 4,221,354 A | 9/1980 | Kempkers | |
| 4,720,028 A | 1/1988 | Takemura et al. | |
| 5,415,457 A | 5/1995 | Kifer | |
| 5,492,260 A | 2/1996 | Rieden et al. | |
| 5,997,081 A | 12/1999 | Kayumi | |
| 6,457,690 B1 | 10/2002 | Spykerman et al. | |
| 6,663,067 B2 | 12/2003 | Gordon | |
| 6,935,601 B2 | 8/2005 | Tanaka | |
| 7,234,672 B1 | 6/2007 | Osterholt et al. | |
| 2005/0076471 A1 | 4/2005 | Watanabe et al. | |

FOREIGN PATENT DOCUMENTS

| | | |
|---|---|---|
| DE | 9405306 U1 | 6/1994 |
| FR | 2897029 A3 | 8/2007 |
| JP | 2003-325267 A | 11/2003 |

OTHER PUBLICATIONS

Korean Patent Office, PCT International Search Report and PCT Written Opinion, mail date of Jun. 29, 2011.

*Primary Examiner* — Steven Marsh
(74) *Attorney, Agent, or Firm* — Clifford B. Vaterlaus; Emerson Thomson Bennett, LLC (57) ABSTRACT

Some embodiments generally relate to a hook assembly, including a pivotable hook body adapted to rotate about a pivot axis running in a generally vertical direction. According to some embodiments, the hook assembly can further include at least one hook portion including a generally vertical recess defined by a portion of the top side of the hook body extending downwardly toward a bottom side. The assembly can further include a pivot member for pivoting the pivotable hook body about the pivot axis; and a frame member adapted to receive the pivotable hook body in a stowed configuration or one or more deployed configurations. Furthermore, frame member is adapted to fix the hook body in a pivotal relation about the pivot axis and can include an indexing opening or seat for defining one or more indexed orientations such as a stowed orientation or a deployed orientation.

18 Claims, 8 Drawing Sheets

MULTIPURPOSE HOOK

I. BACKGROUND

A. Field of Invention

This invention generally relates to rotatable hooks for automobile interiors.

B. Description of the Related Art

It is known to use hooks in an automobile interior for holding various items, such as clothing and grocery bags, in a hanging relation. Furthermore, it is known to have a hook that can be manually manipulated between a stowed and deployed configuration. However, existing hook assemblies have certain disadvantages. For instance, existing assemblies are not adapted to move or yield in a horizontal direction. Therefore, when a force is applied to such a hook there is a danger of damaging the assembly. Accordingly, what is needed is a hook assembly that can move between stowed and deployed orientations by pivoting about a vertical axis and yielding to horizontal forces.

Some embodiments of the present invention provide hook assemblies that differ from the prior art, and that may overcome one or more shortcomings thereof.

II. SUMMARY

Some embodiments relate to a hook assembly, comprising: a pivotable hook body defining a first face and a second face generally parallel to the first face, the first and second faces being spaced apart to define a thickness, and the first and second faces being bounded by at least four sides including a top side, the pivotable hook body further defining a pivot axis running in a generally vertical direction and passing through a central portion of the pivotable hook body, wherein the pivotable hook body is adapted to rotate about the pivot axis; at least one hook portion comprising a generally vertical recess defined by a portion of the top side of the hook body extending downwardly toward a bottom side; a means for pivoting the pivotable hook body about the pivot axis; and a frame member adapted to receive the pivotable hook body in a stowed configuration, the frame member including a receiving member adapted to fix the pivotable hook body in a rotatable relation about the pivot axis.

Some embodiments relate to a hook assembly, comprising: a pivotable hook body defining a first face and a second face generally parallel to the first face, the first and second faces being spaced apart to define a thickness, and the first and second faces being bounded by at least four sides including a top side, the pivotable hook body further defining a pivot axis running in a generally vertical direction through the pivotable hook body, wherein the pivotable hook body is adapted to rotate about the pivot axis; at least one hook portion comprising a generally vertical recess defined by a portion of the top side of the hook body extending downwardly toward a bottom side; and a pivot mechanism comprising a pair of pivot pins disposed at opposing top and bottom sides of the pivotable hook body, and further comprising a pair of pivot pin seats in a frame member, the seats being adapted to receive the pivot pins in a pivotal relation, wherein the frame member is adapted to receive the pivotable hook body in a stowed configuration.

Some embodiments relate to a hook assembly, comprising: a hook body pivotable about a generally vertical pivot axis; at least one hook portion comprising a generally vertical recess defined by a portion of the hook body; at least one pivot pin defined at an edge of the hook body; a frame member adapted to receive the hook body in a pivotal relation having at least a 180 degree range of motion, and adapted to substantially surround a perimeter of the hook body; and at least one pivot pin seat defined in the frame member and adapted to receive the at least one pivot pin in a pivotal relation having at least a 180 degree range of motion.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

According to some embodiments, a hook assembly comprises a pivotable hook body. The hook body can define a first face and a second face generally parallel to the first face, wherein the first and second faces are spaced apart to define a thickness. The first and second faces can be bounded by at least four sides including a top side and a bottom side. The pivotable hook body can further define a pivot axis running in a generally vertical direction and pass through a center, off-center, or end portion of the pivotable hook body. Some embodiments further include a frame member adapted to receive the pivotable hook body in one or more stowed configuration and/or deployed configurations. The frame member can include a receiving member adapted to fix the pivotable hook body in a rotatable relation about the pivot axis.

Some embodiments can optionally include a means for reversibly fixing the pivotable hook body in a stowed configuration and/or one or more deployed configurations. Accordingly, in some embodiments the pivotable hook body can be, for instance, reversibly snapped into a stowed configuration generally coplanar with the frame member. Furthermore, some embodiments allow the pivotable hook body to be rotated about the pivot axis through one or more discrete and/or indexed deployed configurations. Such rotation can be caused by applying a small pressure, for instance, by pushing or pulling with the fingers. Thus, a user can move the pivotable hook body through a predetermined first, second, third or greater deployed position by manipulating the pivotable hook body by hand and with relatively small amounts of force. Accordingly, in some embodiments, children and/or elderly users may find the hook assembly easy to use.

Figure 1A:
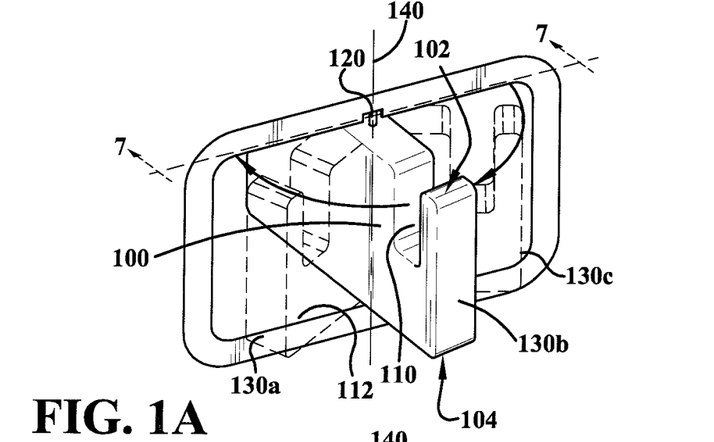
FIG. 1A is a perspective view showing an embodiment in a plurality of deployed positions.
Figure 1B:
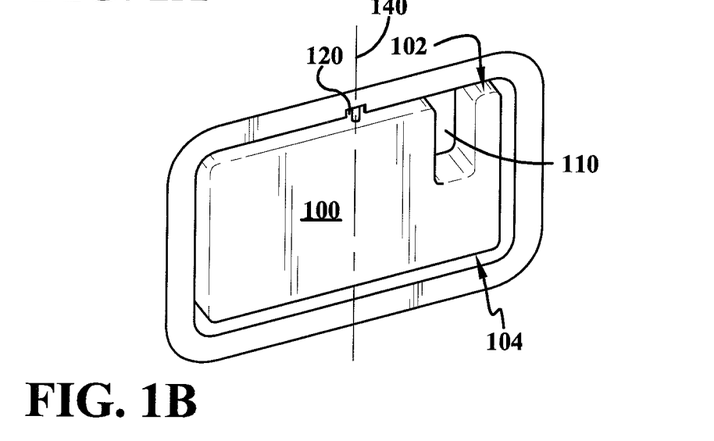
FIG. 1B is a perspective view showing an embodiment in a stowed position.
Figure 1C:
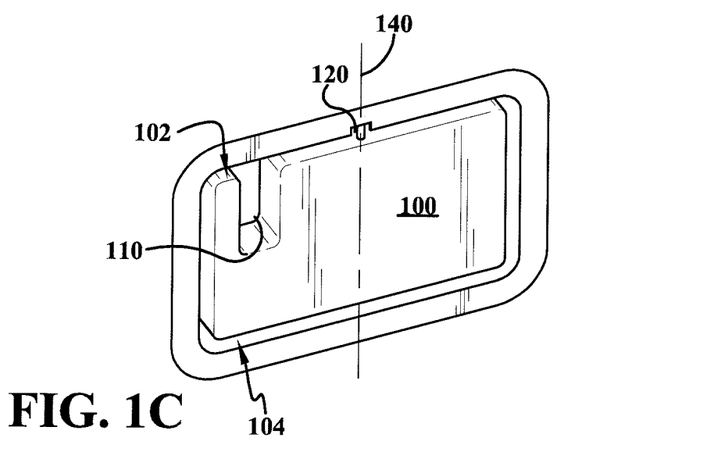
FIG. 1C is a perspective view showing an embodiment in a stowed position.

Referring now to the drawings wherein the showings are for purposes of illustrating embodiments of the invention only and not for purposes of limiting the same, FIG. 1A is a perspective view of an embodiment comprising a pivotable hook body 100 received by a frame member 112. The pivotable hook body 100 includes a top side 102 and a bottom side 104, and a hook portion 110 comprising a generally vertical recess defined by a portion of the top side 102 of the hook body 100 extending downwardly toward a bottom side 104. An optional notch 120 is included in the frame member 112. The hook body 100 is rotatable about an approximately central vertical pivot axis 140, and is shown in a deployed configuration 130b having a deployment angle of 90 degrees measured relative to a 0 degree stowed position. Additionally, two intermediate positions 130a, 130c are shown in broken lines. FIG. 1B shows the hook body 100 in a first stowed configuration, and FIG. 1C shows the hook body 100 in a second stowed configuration.

Figure 2A:
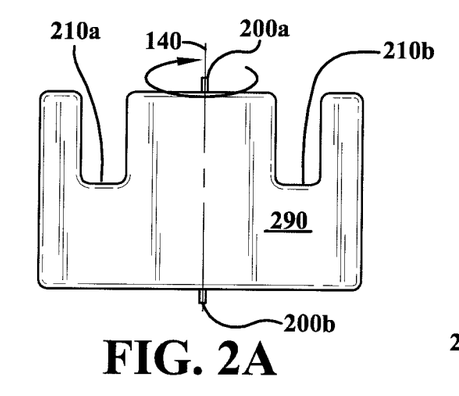
FIG. 2A is a drawing of a double-ended hook embodiment.
Figure 2B:
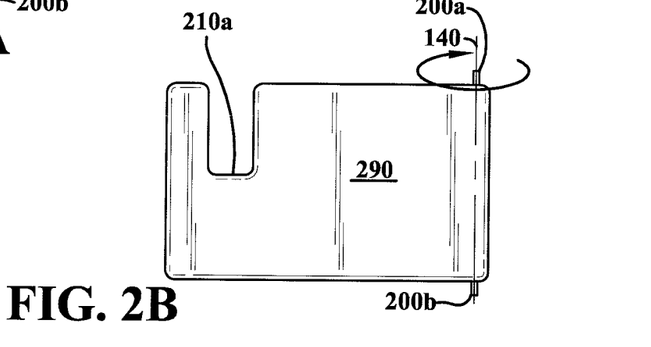
FIG. 2B is a drawing of an embodiment having a pivot axis near one end.
Figure 2C:
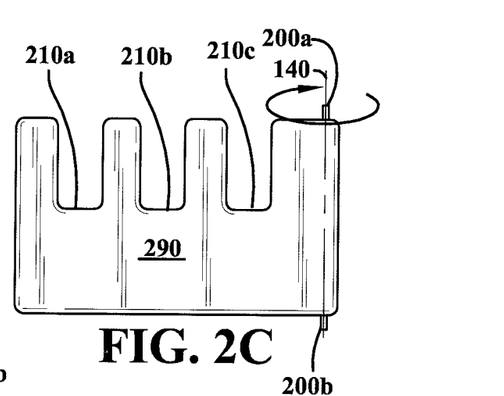
FIG. 2C is a drawing of an embodiment having a plurality of hook portions and a pivot axis near one end.
Figure 2D:
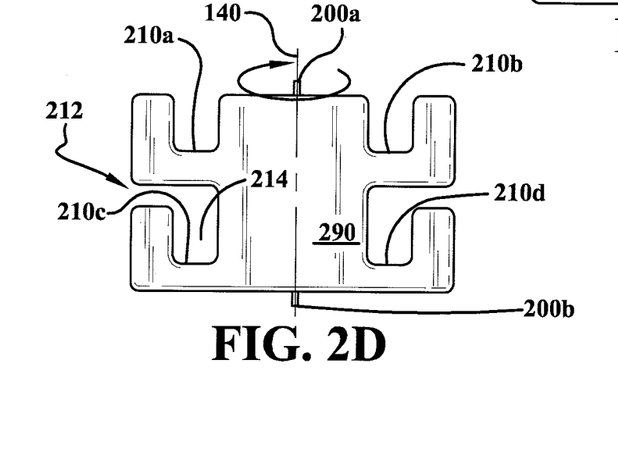
FIG. 2D is a drawing of an embodiment having upper and lower hook portions.

FIG. 2A shows a front view of pivotable hook body 290 having two hook portions 210a, 210b approximately equally spaced from a vertical pivot axis 140. FIG. 2A also shows a pair of a opposing pivot pin members 200a, 200b disposed on the top face 102 and bottom face 104 respectively. FIG. 2B shows a hook body 290 having a single hook portion 210a and a vertical pivot axis 140 near an opposing end, and passing through a top pivot pin 200a and an opposing bottom pivot pin 200b. FIG. 2C shows a pivotable hook body 290 similar to that of FIG. 2B, but having three hook portions 210a, 210b and 210c. FIG. 2D shows pivotable hook body 290 having an approximately central vertical pivot axis 140 passing through a top pivot pin 200a and a bottom pivot pin 200b. The hook body 290 includes a pair of upper hook portions 210a, 210b spaced approximately equally from the pivot axis 140. The hook body 290 of FIG. 2D also includes a pair of lower hook portions 210c, 210d spaced approximately equally from the pivot axis 140. Each of the lower hook portions 210c, 210d define an opening 212 in the side of the hook body 290, which extends toward the vertical axis 140 and further includes a generally vertical opening 214. One of skill in the art will recognize that a hook body 290 can include any number of vertically and/or horizontally arranged hook portions.

Figure 3A:
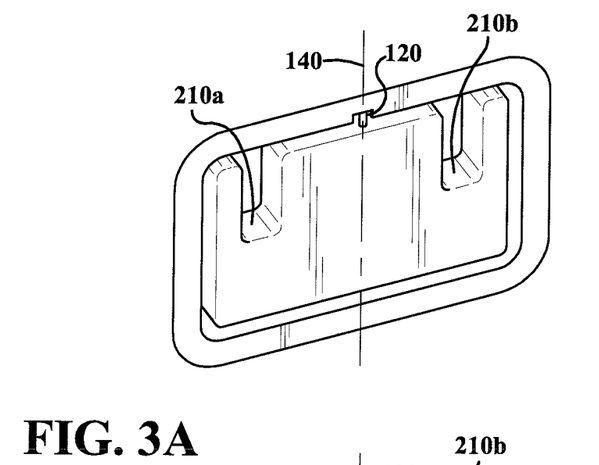
FIG. 3A is a perspective view showing an embodiment in a deployed configuration.
Figure 3B:
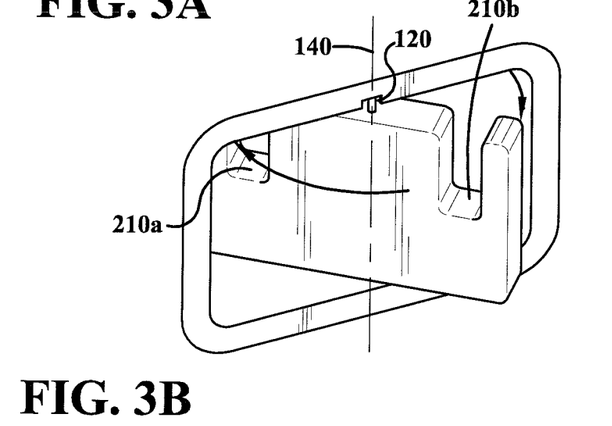
FIG. 3B is a perspective view showing an embodiment in a stowed position.
Figure 3C:
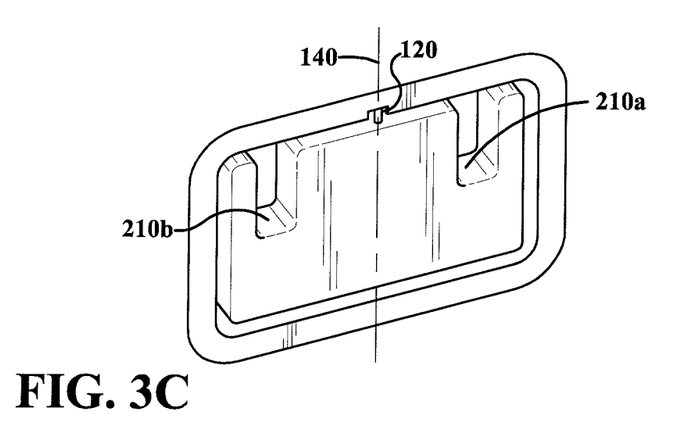
FIG. 3C is a perspective view showing an embodiment in a stowed position.
Figure 4A:
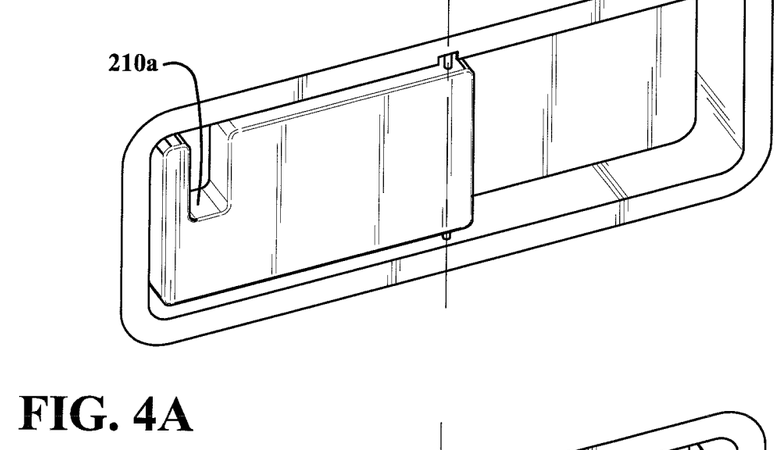
FIG. 4A is a perspective view showing an embodiment in a stowed configuration.
Figure 4B:
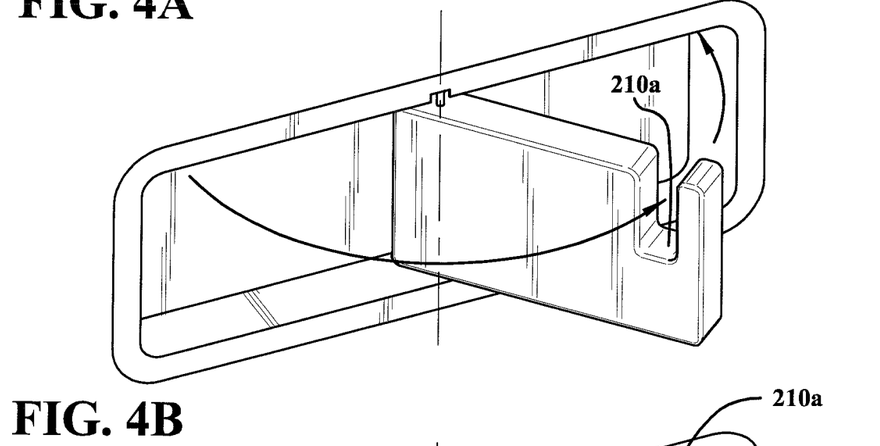
FIG. 4B is a perspective view showing an embodiment in a deployed.
Figure 4C:
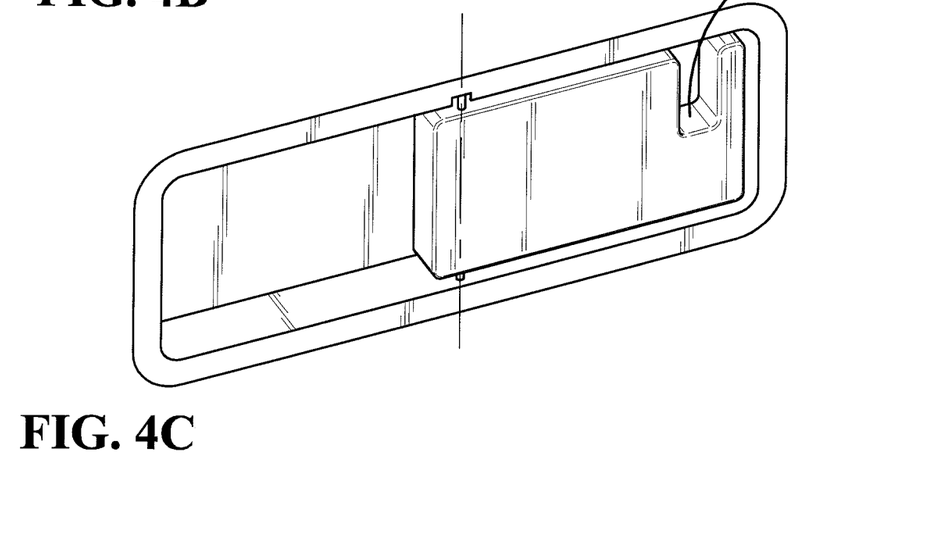
FIG. 4C is a perspective view showing an embodiment in a stowed configuration.
Figure 5A:
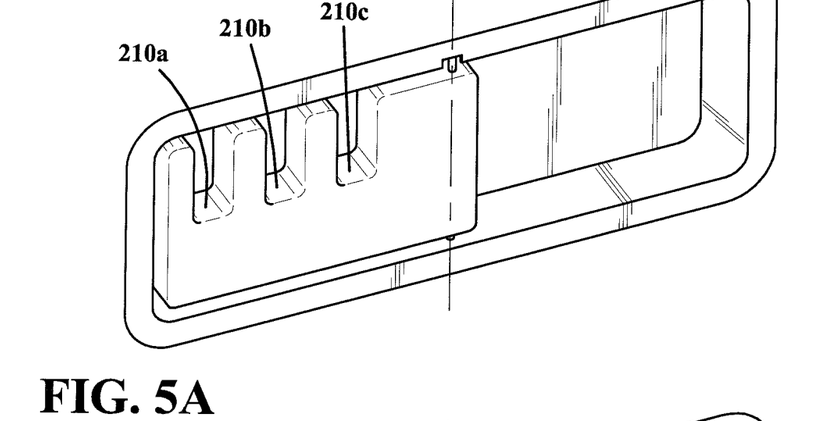
FIG. 5A is a perspective view showing an embodiment in a stowed configuration.
Figure 5B:
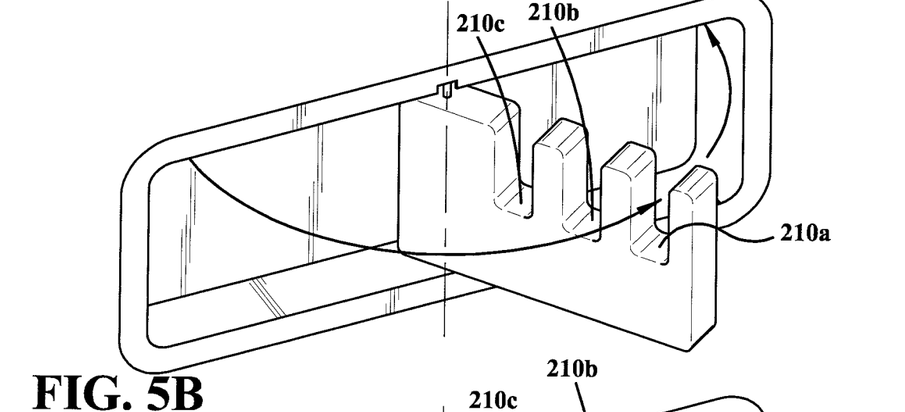
FIG. 5B is a perspective view showing an embodiment in a deployed configuration.
Figure 5C:
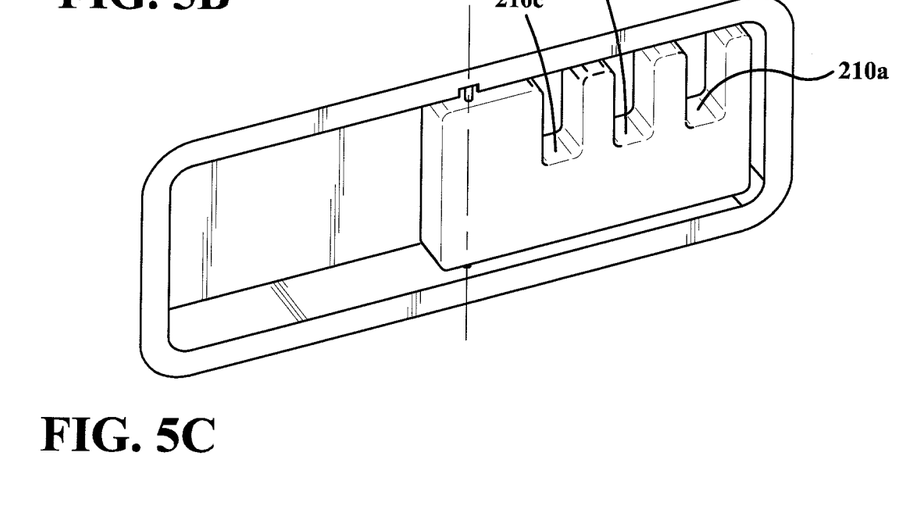
FIG. 5C is a perspective view showing an embodiment in a stowed configuration.
Figure 6A:
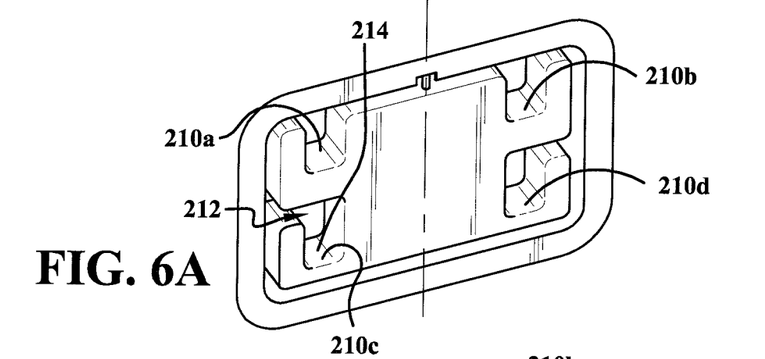
FIG. 6A is a perspective view showing an embodiment in a stowed configuration.
Figure 6B:
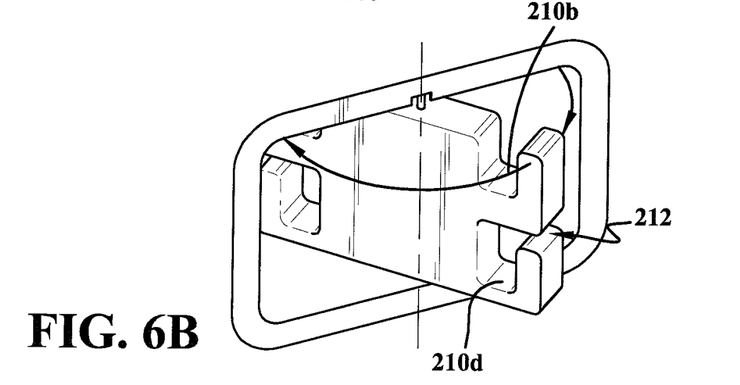
FIG. 6B is a perspective view showing an embodiment in a deployed configuration.
Figure 6C:
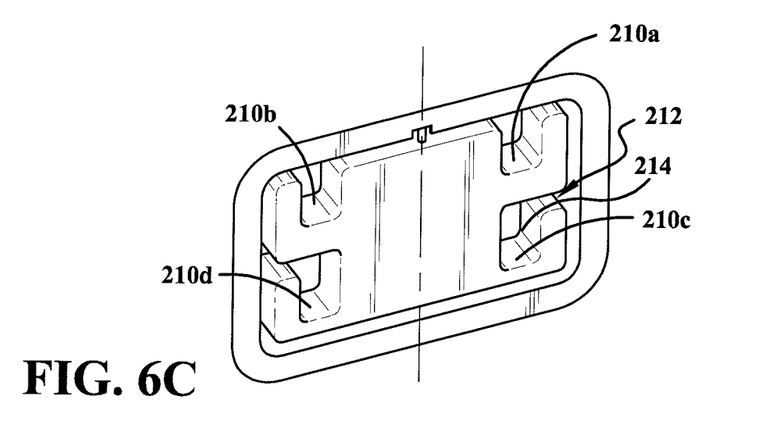
FIG. 6C is a perspective view showing an embodiment in a stowed configuration.

FIG. 3A shows the hook body 290 of FIG. 2A in a first stowed configuration. FIG. 3B shows the hook body 290 pivoting about the pivot axis 140, and coming to rest in a second stowed configuration in FIG. 3C. FIG. 4A shows the hook body 290 of FIG. 2B in a first stowed configuration. FIG. 4B shows the hook body 290 pivoting about the pivot axis 140, and coming to rest in a second stowed configuration in FIG. 4C. FIG. 5A shows the hook body 290 of FIG. 2C in a first stowed configuration. FIG. 5B shows the hook body 290 pivoting about the pivot axis 140, and coming to rest in a second stowed configuration in FIG. 5C. FIG. 6A shows the hook body 290 of FIG. 2D in a first stowed configuration. FIG. 6B shows the hook body 290 pivoting about the pivot axis 140, and coming to rest in a second stowed configuration in FIG. 6C.

Figure 7:
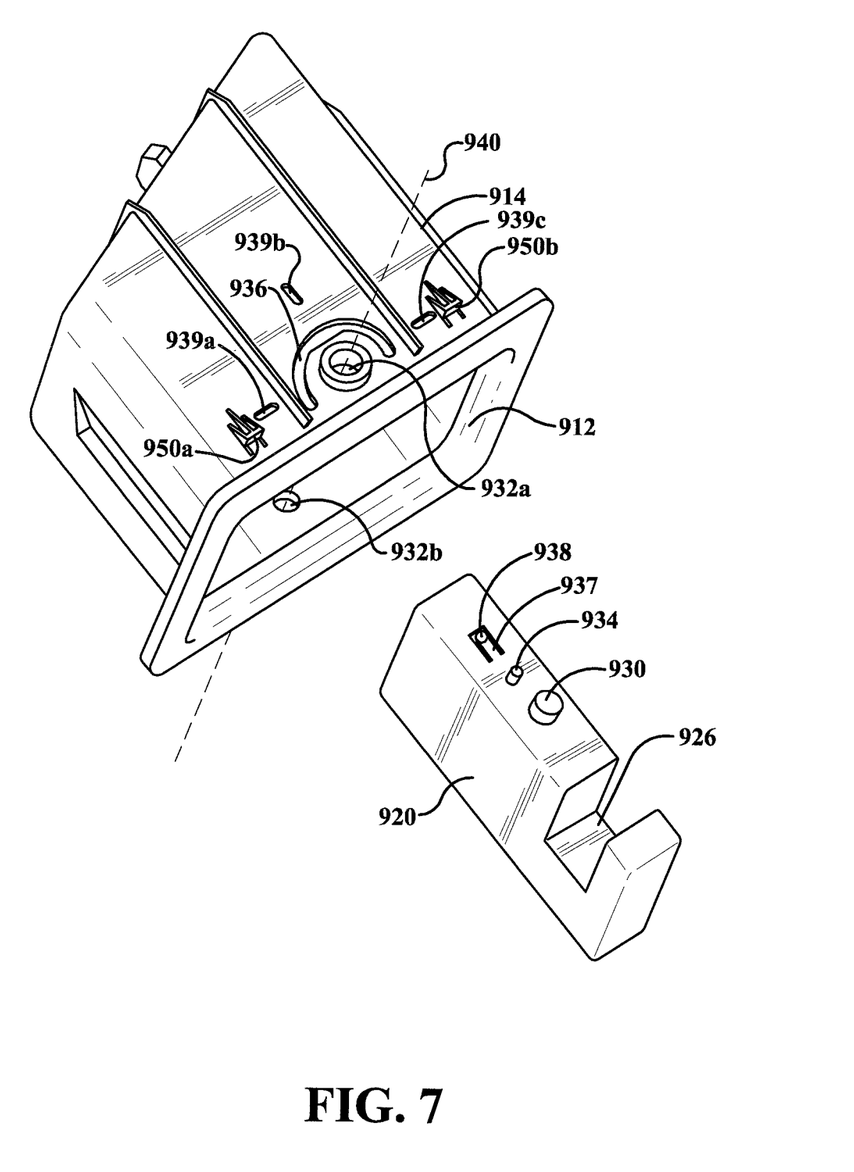
FIG. 7 is a perspective exploded view of an embodiment.

FIG. 7 shows an embodiment having a frame member 912 that includes a housing member 914 defining a recess providing the hook body 920 with sufficient room to rotate about the pivot axis 940. The hook body 920 includes a hook portion 926 comprising a generally vertical recess defined by a portion of the top side of the hook body 920 extending downwardly toward a bottom side, as shown. The housing 914 further includes a first mounting tab 950 a and a second mounting tab 950 b located at opposing sides of the housing, and providing a means for mounting the hook assembly to, for instance, a wall structure. The housing 914 further includes an upper pivot pin seat 932 a and a lower pivot pin seat 932 b, both having a circular cross section adapted to receive the upper pivot pin 930 and lower pivot pin (not shown) in a pivotal relation. Accordingly, in this embodiment, the pivot pins 930 and/or seats 932 a, 932 b do not include an indexing means.

With further regard to FIG. 7, the housing 914 also includes a semicircular opening 936 adapted to receive mechanical stop pin 934 in a sliding relation. The combination of the mechanical stop pin 934 and the semicircular opening 936 functions to limit the range of motion of the hook body 920 to about 180 degrees. The hook body 920 further comprises a detent 938 disposed on the end of a flexible tab 937. The detent 938 is adapted to slide over an inside surface of the housing 914 under compressive force provided by the flexible tab 937. The detent is further adapted to mate with indexing openings 939 a, 939 b, 939 c in a seated relation. The cooperative operation of the indexing opening 939 a, 939 b, 939 c, the detent 938 and the flexible tab 937 provides an indexing means. Therefore, the assembly can be in a deployed configuration with the hook portion 926 oriented outward when the detent 938 is seated in indexing opening 939 b, or can be in a stowed configuration when the detent 938 is seated in either of indexing openings 939 a or 939 c. Some embodiments can further include a rod (not shown) substantially collinear with the pivot axis 940, which is adapted to join the housing 914 to the hook body 920 in a pivotal relation.

Figure 8A:
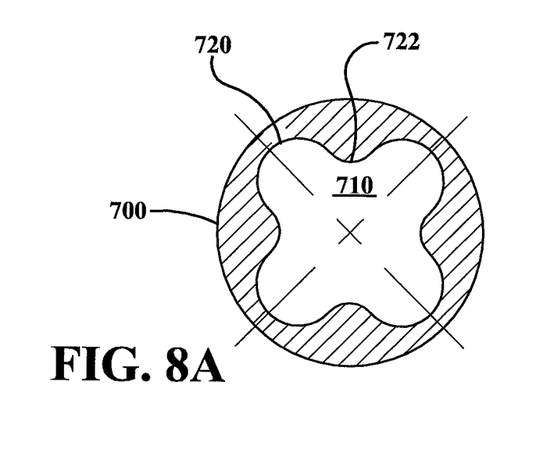
FIG. 8A is plan view of a two-position pivot pin seat defining a pair of generally perpendicular seats.
Figure 8B:
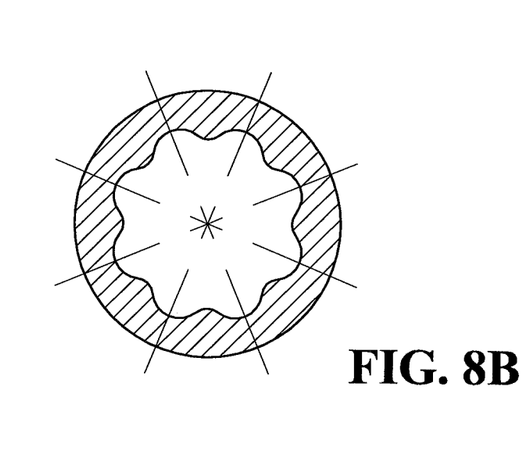
FIG. 8B is plan view of a four-position pivot pin seat defining a plurality of equally spaced seats.

FIG. 8A and FIG. 8B show alternative pivot pin seats 700 that can be defined in frame 112, and are adapted to receive pivot pins such as 200a and/or 200b in a rotatable indexed relation. Accordingly, embodiments having such pivot pin seats provide an indexing means in combination with the means for pivoting. For instance, in FIG. 8A a seat includes an opening 710 adapted to receive a suitably shaped pivot pin. The opening 710 includes a plurality of generally rounded lobes 720 and troughs 722 equally spaced apart. The seat of FIG. 8A comprises a two-position seat 700, including a deployed position having a deployment angle of 90 degrees, and at least one stowed position (i.e. 0 and/or 180 degrees). FIG. 8B shows a pivot pin seat 700 having four positions: at least one stowed position, and three deployed positions, wherein the deployment angles are 45, 90, and 135 degrees. Both FIGS. 8A and 8B are drawn with arbitrarily circular outer boundaries. However, one of skill in the art will recognize that the seats can be formed in a frame member such as frame 112, and thus may not include outer boundaries of any particular shape. A circular outer boundary shape is chosen here only for the purposes of illustration, and is not intended to be limiting.

One of skill in the art will recognize that such indexed seats can take a variety of forms. For example, a suitable indexed pivot pin seat can comprise a plurality of teeth, such as circular, elliptical, triangular and/or rectangular teeth. Furthermore, such teeth can be equally spaced apart, or can be spaced according to a predetermined pattern. Still further, some seats may not be indexed at all. For instance, an embodiment can include one indexed seat and one non-indexed seat. Still other embodiments can include no indexed seats, and instead include a pair of non-indexed seats having, for instance, circular cross sections.

Figure 9A:
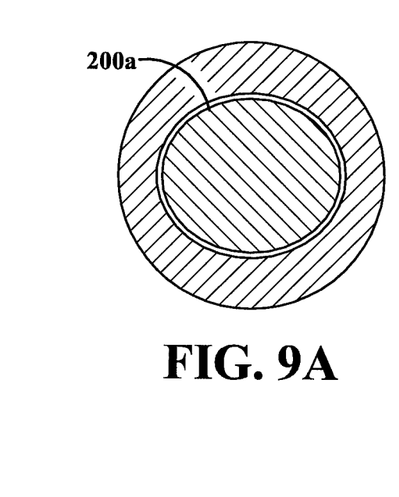
FIG. 9A is a plan view of a radial cross section of a pivot pin having two lobes.
Figure 9B:
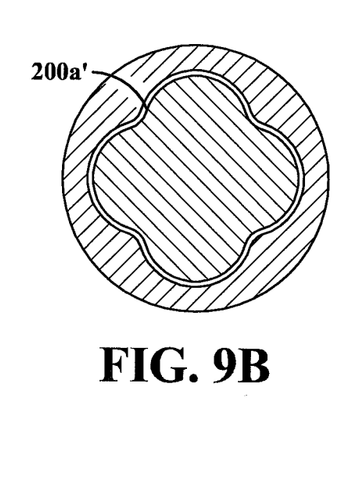
FIG. 9B is a plan view of a radial cross section of a pivot pin having four lobes.
Figure 9C:
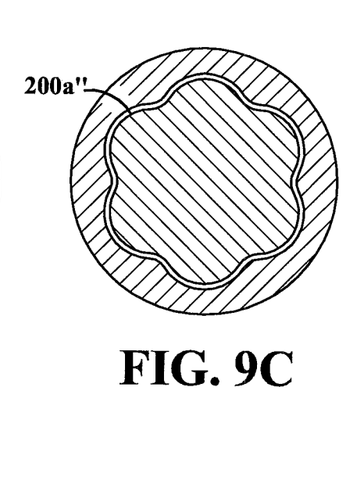
FIG. 9C is a plan view of a radial cross section of a pivot pin having six lobes.
Figure 9D:
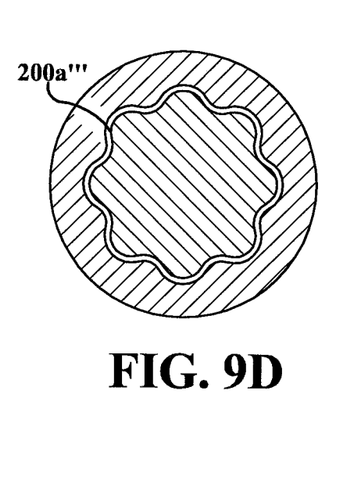
FIG. 9D is a plan view of a radial cross section of a pivot pin having eight lobes.

FIGS. 9A, B, C, and D show a plurality of pivot pin seats having progressively greater numbers of indexed positions, wherein the seats are each shown receiving a pivot pin 200a, 200a prime, 200a double prime, and 200a triple prime. According to FIGS. 9A, B, C, and D a pivot pin seat 700 and pivot pin 200a, 200a prime, 200a double prime, and 200a triple prime, each have matching numbers of lobes 720. However, one of skill in the art will recognize that this is not required, and that a pivot pin 200 can include fewer lobes than the seat 700 to which it mates. Furthermore, one of skill in the art will recognize that it may be desirable to have a pivot pin with a minimum number of lobes so as to provide an assembly that requires a minimum amount of force to manipulate.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

We claim:

1. A hook assembly, comprising:
   a pivotal hook body comprising: a length defining a longitudinal axis, a top side; a bottom side; a first longitudinal end; a second longitudinal end opposite the first longitudinal end; and, a central portion that is positioned longitudinally between the first and second ends;
   a first hook portion positioned on the first longitudinal end of the pivotal hook body and comprising a recess defined by a first portion of the top side of the hook body extending downwardly toward the bottom side;
   a pivot member that: is positioned in the central portion of the pivotal hook body; defines a pivot axis; and, extends through at least one of the top side and the bottom side of the pivotal hook body;
   a frame member comprising a housing that: receives the pivot member to provide a pivotal connection of the pivotal hook body to the frame member; has top and bottom surfaces and first and second sides defining a recess that is between the top and bottom surfaces and between the first and second sides;
   wherein the pivotal hook body is pivotal about the pivot axis: (1) in a first direction from a configuration where the first hook portion extends out of the recess and is accessible to a configuration wherein the first hook portion is positioned within the recess on the first side and is inaccessible, and (2) in a second direction that is opposite the first direction from the configuration where the first hook portion extends out of the recess and is accessible to a configuration wherein the first hook portion is positioned within the recess on the second side and is inaccessible;
   wherein the pivotal hook body has a stop pin that extends from one of the top side and the bottom side; and,
   wherein the housing comprises an opening formed in one of the top and bottom surfaces that receives the stop pin and limits the range of motion of the pivotal hook body.

2. The hook assembly of claim 1 wherein the opening that receives the stop pin is semicircular in shape and limits the range of motion of the pivotal hook body to about 180 degrees.

3. The hook assembly of claim 1 wherein:
   the stop pin is positioned longitudinally between the pivot member and the second longitudinal end of the pivotal hook body.

4. The hook assembly of claim 1 wherein the first and second longitudinal ends of the pivotal hook body are substantially equidistant from the pivot.

5. The hook assembly of claim 1 wherein the pivot axis is oriented substantially vertically.

6. A hook assembly, comprising:
   a pivotal hook body comprising: a length defining a longitudinal axis, a top side; a bottom side; a first longitudinal end; a second longitudinal end opposite the first longitudinal end; and, a central portion that is positioned longitudinally between the first and second ends;
   a first hook portion positioned on the first longitudinal end of the pivotal hook body and comprising a recess defined by a first portion of the top side of the hook body extending downwardly toward the bottom side;
   a pivot member that: is positioned in the central portion of the pivotal hook body; defines a pivot axis; and, extends through at least one of the top side and the bottom side of the pivotal hook body;
   a frame member comprising a housing that: receives the pivot member to provide a pivotal connection of the pivotal hook body to the frame member; has top and bottom surfaces and first and second sides defining a recess that is between the top and bottom surfaces and between the first and second sides;
   wherein the pivotal hook body is pivotal about the pivot axis: (1) in a first direction from a configuration where the first hook portion extends out of the recess and is accessible to a configuration wherein the first hook portion is positioned within the recess on the first side and is inaccessible, and (2) in a second direction that is opposite the first direction from the configuration where the first hook portion extends out of the recess and is accessible to a configuration wherein the first hook portion is positioned within the recess on the second side and is inaccessible;
   wherein the pivotal hook body has a detent disposed on a distal end of a flexible tab that is attached to one of the top side and the bottom side;

the frame member comprises first and second indexing openings formed in one of the top and bottom surfaces; and, the tab: slides on one of the top and bottom surfaces of the frame member under compressive force provided by the flexible tab as the pivotal hook body pivots about the pivot axis; and, is seatable within the first and second indexing openings, respectively, to provide first and second indexed locations for the pivotable hook body.

7. The hook assembly of claim 6 wherein:

the frame member comprises a third indexing opening formed in one of the top and bottom surfaces;

the tab is seatable within the third indexing opening to provide a third indexed location for the pivotable hook body; and, the first, second and third indexing openings provide indexed locations for the deployed configuration, the first stowed configuration, and the second stowed configuration, respectively.

8. The hook assembly of claim 6 wherein:

the detent is positioned longitudinally between the pivot member and the second longitudinal end of the pivotal hook body.

9. The hook assembly of claim 6 wherein the first and second longitudinal ends of the pivotal hook body are substantially equidistant from the pivot member.

10. The hook assembly of claim 6 wherein the pivot axis is oriented substantially vertically.

11. The hook assembly of claim 1 wherein:

a pivot pin seat is formed in one of the top and bottom surfaces and rotatably receives a seat portion of the pivot member to provide a pivotal connection of the pivotal hook body to the frame member;

the seat portion of the pivot member has a non-circular cross-section; and the pivot pin seat has a shape that matches the seat portion of the pivot member in order to provide at least first and second indexed locations for the pivotal hook body.

12. The hook assembly of claim 11 wherein:

the seat portion of the pivot member is elliptical in cross-section; and the pivot pin seat has a matching elliptical shape.

13. The hook assembly of claim 11 wherein:

the pivot pin seat defines an opening having at least two lobes and two troughs; and the seat portion of the pivot member has a matching shape.

14. The hook assembly of claim 11 wherein:

the pivot pin seat defines an opening having at least four lobes and four troughs; and the seat portion of the pivot member has a matching shape.

15. The hook assembly of claim 1 further comprising:

a second hook portion positioned on the first longitudinal end of the pivotal hook body between the first hook portion and the pivot member, the second hook portion comprising a recess defined by a second portion of the top side of the hook body extending downwardly toward the bottom side.

16. The hook assembly of claim 1 further comprising:

a second hook portion positioned on the first longitudinal end of the pivotal hook body below the first hook portion.

17. The hook assembly of claim 6 further comprising:

a second hook portion positioned on the first longitudinal end of the pivotal hook body between the first hook portion and the pivot member, the second hook portion comprising a recess defined by a second portion of the top side of the hook body extending downwardly toward the bottom side.

18. The hook assembly of claim 6 further comprising:

a second hook portion positioned on the first longitudinal end of the pivotal hook body below the first hook portion.

* * * * *